United States Patent [19]
Ozaki

[11] Patent Number: 5,933,465
[45] Date of Patent: *Aug. 3, 1999

[54] CONTROL SIGNAL DETECTION METHOD WITH CALIBRATION ERROR AND SUBSCRIBER UNIT THEREWITH

[75] Inventor: Shinji Ozaki, Saitama, Japan

[73] Assignee: Sony Corporation, Tokyo, Japan

[ * ] Notice: This patent is subject to a terminal disclaimer.

[21] Appl. No.: 08/828,387

[22] Filed: Mar. 28, 1997

Related U.S. Application Data

[62] Division of application No. 08/670,748, Jun. 21, 1996, Pat. No. 5,657,356.

[30] Foreign Application Priority Data

Jun. 27, 1995 [JP] Japan ................................ 7-183353

[51] Int. Cl.$^6$ ................... H03D 1/06; H04L 1/00
[52] U.S. Cl. ............................... 375/346; 375/316
[58] Field of Search ....................... 375/346, 348, 375/371, 226, 316

[56] References Cited

U.S. PATENT DOCUMENTS 5,657,356  8/1997  Ozaki ................................. 375/346

*Primary Examiner*—Stephen Chin
*Assistant Examiner*—Mohammad Ghayour
*Attorney, Agent, or Firm*—Jay H. Maioli

[57] ABSTRACT

In a control signal detection method, a calibration error value is obtained by obtaining the mean value of the received continuous (4×n) data, and the calibration error is compensated with respect to the received data by subtracting the obtained calibration error value from the received data, and the correlation value is obtained on the basis of the corrected received data, so that the control signal is detected. Therefore, it is able to compensate the calibration error with ease and to detect the control signal efficiently, with a simple construction.

8 Claims, 7 Drawing Sheets

CONTROL SIGNAL DETECTION METHOD WITH CALIBRATION ERROR AND SUBSCRIBER UNIT THEREWITH

This is a division of application Ser. No. 08/670,748 filed Jun. 21, 1996 U.S. Pat. No. 5,657,356.

BACKGROUND OF THE INVENTION

1. Field of the Invention

This invention relates to a control signal detection method with calibration error and a subscriber unit for use therewith, and is applicable to, for instance, the digital cellular telephone system which is referred to as the GSM (Groupe Speciale Mobile) cellular system and that is standardized in Europe.

2. Description of the Related Art

Heretofore, in the GSM cellular system, a circuit is connected between a base station and mobile terminal equipment using the time division multiple access (TDMA) system, and voice data and others which have been coded are transmitted and received.

In the GSM cellular system, 124 broadcast channels are prepared as physical channels. Each broadcast channel is time-shared into 8 channels by the TDMA system. Logical channels are roughly separated into 2 channels, that is, an information channel and a control channel. The information channel is used to transmit coded voice data, etc., and the control channel is used to transmit various control signals.

The control channel includes a broadcast control channel (BCCH), a frequency correction channel (FCCH), a synchronization channel (SCH), a paging channel (PCH), a random access channel (RACH), attendant control channels, namely a slow associated control channel (SACCH), and a fast associated control channel (FACCH), etc.

In the GSM cellular system, the Gaussian filtered minimum shift keying (GMSK) is used as a modulating system, and each data is exposed to GMSK modulation and then transmitted. An example of the GMSK modulation has been disclosed in U.S. Pat. No. 5,131,008, assigned to Motorola Inc. In this patent, compensation of an in-phase signal and a quadrature signal is performed based on a coherent carrier signal.

By the way, to perform connection of a circuit by means of the time division multiple access, synchronization must be established between a base station and mobile terminal equipment. Therefore, after the electric power source has been energized, the mobile terminal equipment first detects the FCCH in the control channel which is transmitted by the base station, and then roughly realizes the initial synchronization on the basis of the detected FCCH and corrects the oscillating frequency of the local oscillator (hereinafter, this is referred to as the local oscillation frequency). However, the fine synchronism is established by the means of the SCH.

As shown in FIG. 1, one period of the control channel is comprised of 51 frames, and each frame is comprised of 8 slots. On the GSM cellular system, burst data in each slot are transmitted and received. On the control channel which has a constitution like this, the FCCH is inserted once (1 slot) within 10 frames. The FCCH is a control signal which is composed of continuous [0]s of the stated bits, and the data are not varied to [0] or to [1], as contrasted to the other burst data. Therefore, when the received data of the case where the FCCH has been normally received is represented on a complex plane, the signal points are respectively rotated by 90° in the same direction, as shown in FIG. 2. This is due to the fact that when the transmitted data are the series of the same values, signal points are respectively rotated by 90° in the same direction on the same circle on a complex plane, in the case of GMSK modulation.

To detect such a FCCH, the mobile terminal equipment performs a calculation which is represented by the following expression:

$$\text{correlation value} = \left| \sum_{k=0}^{N} (i_k, q_k) \times e^{-jP} \right| \quad (1)$$

$$\text{where, } P = \frac{\pi}{2} k$$

with respect to the I,Q data $(i_k, q_k)$ which is the received data, and obtains the correlation value. More specifically, the mobile terminal equipment is provided with a correlation value calculating circuit 1 shown in FIG. 3, so that the correlation value is obtained by this.

The received I,Q data $(i_k, q_k)$ is first fed to a multiplier 2, and multiplied, by $e^{-jP}$ which is outputted from a numeric value generator 3 (where, $P=\pi k/2$). The result of this multiplication is fed to an N-stage shift register 4, and shifted sequentially. N pieces of data which are output from the shift register 4 are respectively fed to an adder 5, and added. The result of the addition is fed into an absolute value circuit 6, so that the correlation value is obtained.

This obtained correlation value becomes a large value in the case where the received data is FCCH, and becomes a small value in the other cases, as shown in FIG. 4. Therefore, if the magnitude of the correlation values is continuously examined, the FCCH can be detected on the basis of such a fact that the correlation value have reached to the maximum value.

By the way, to obtain the correlation value, at first, standard adjustment (hereinafter, this is referred to as calibration) must be performed in such a manner that the center of the I,Q data comes to the position of the origin (0, 0) on the complex plane, prior to the start of receiving. Because, some signals are occasionally output owing to the characteristics of the circuits of the receiving system, even though it is in the non-receiving status. In order to compensate this, it is necessary that the center of the I,Q data be adjusted to the position of the origin on the complex plane. When such calibration is performed, heretofore, an analog calibration circuit shown in FIG. 5 is utilized.

In this calibration circuit 10, in the first place, at non-receiving time, switches SW1 and SW2 are brought into OFF state, and a switch SW3 is brought into ON state. By this, the difference of the I component and the −I component is charged in a capacitor C1, through a differential amplifier 11.

On the other hand, when receiving has been started, in the calibration circuit 10, the switches SW1 and SW2 are brought into ON state, and a switch SW3 is brought into OFF state. By this, compensation is performed with respect to the I component and the −I component, by the difference of non-receiving time, by means of current sources A1 to A4 and a differential amplifier 12, according to the electric charge which has been charged in the capacitor C1. In this connection, compensation is also performed in a similar manner with respect to the Q component.

By the way, in the GSM cellular system, only one slot of FCCH exists in 10 frames as stated above; therefore, continuous receiving operation of a long time (about 50 [mS] which is corresponding to about 11 frames) is needed, until an FCCH is detected. In this case, such a phenomenon occurs that the compensation comes to be not performed correctly, because the electric charge that has been charged in the capacitor C1 of the abovementioned calibration circuit 10 is discharged. As a result, so-called calibration error occurs, which is such a phenomenon that the calibration which has been performed prior to the start of reception drifts in proportion as reception advances, as shown in FIG. 6.

Such a calibration error has bad influences; the probability of detection of FCCH is lowered, an error occurs in the estimate which is estimated when the drift of the local oscillation frequency (hereinafter, this is referred to as local oscillation frequency offset) would be calibrated, and others. Explaining it concretely, because a correlation value is used in order to detect FCCH as stated above, if a calibration error exists then the correlation value becomes small, therefore the probability of detection of FCCH is lowered.

When the local oscillation frequency offset is estimated, it is estimated on the basis of the quantity of phase drift ($\Delta\theta$) of the I,Q data, as shown in FIG. 7A. If the calibration has drifted, then a phase error ($=\Delta\theta'-\Delta\theta$) occurs as shown in FIG. 7B, so that an error occurs in the estimate of the local oscillation frequency offset as well.

SUMMARY OF THE INVENTION

In view of the foregoing, an object of this invention is to provide a control signal detection method which is able to detect the control signal efficiently and to compensate a calibration error easily with a simple construction, and a subscriber unit which utilizes the method.

The foregoing object and other objects of this invention have been achieved by the provision of a control signal detecting method in which a calibration error is obtained by obtaining the mean value of the received continuous (4×n) data, the calibration error is compensated toward the received data by subtracting the obtained calibration error from the received data, and the correlation value is obtained on the basis of the corrected received data, so that the control signal is detected.

In the case where the received data are rotated by 90° in the same direction on a complex plane, and where there is no calibration error, the mean value of the received continuous (4×n) data becomes zero. In other words, the center of the received continuous (4×n) data lies at the origin of the complex plane. However, if there is a calibration error, the mean value of the received continuous (4×n) data does not become zero. In other words, the center of the received continuous (4×n) data lies at a position which is shifted from the origin of the complex plane. This discrepancy with the origin of the complex plane represents the calibration error. Therefore, the calibration error can be obtained by obtaining the mean value of the received continuous (4×n) data.

By subtracting the calibration error which has been thus obtained from the received data, the calibration error can be easily compensated with reference to the received data. When the correlation value is obtained on the basis of the received data which have been thus corrected, it can be avoided that the correlation value is diminished as usual due to a calibration error, and so the control signal can be detected efficiently and certainly.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 8:
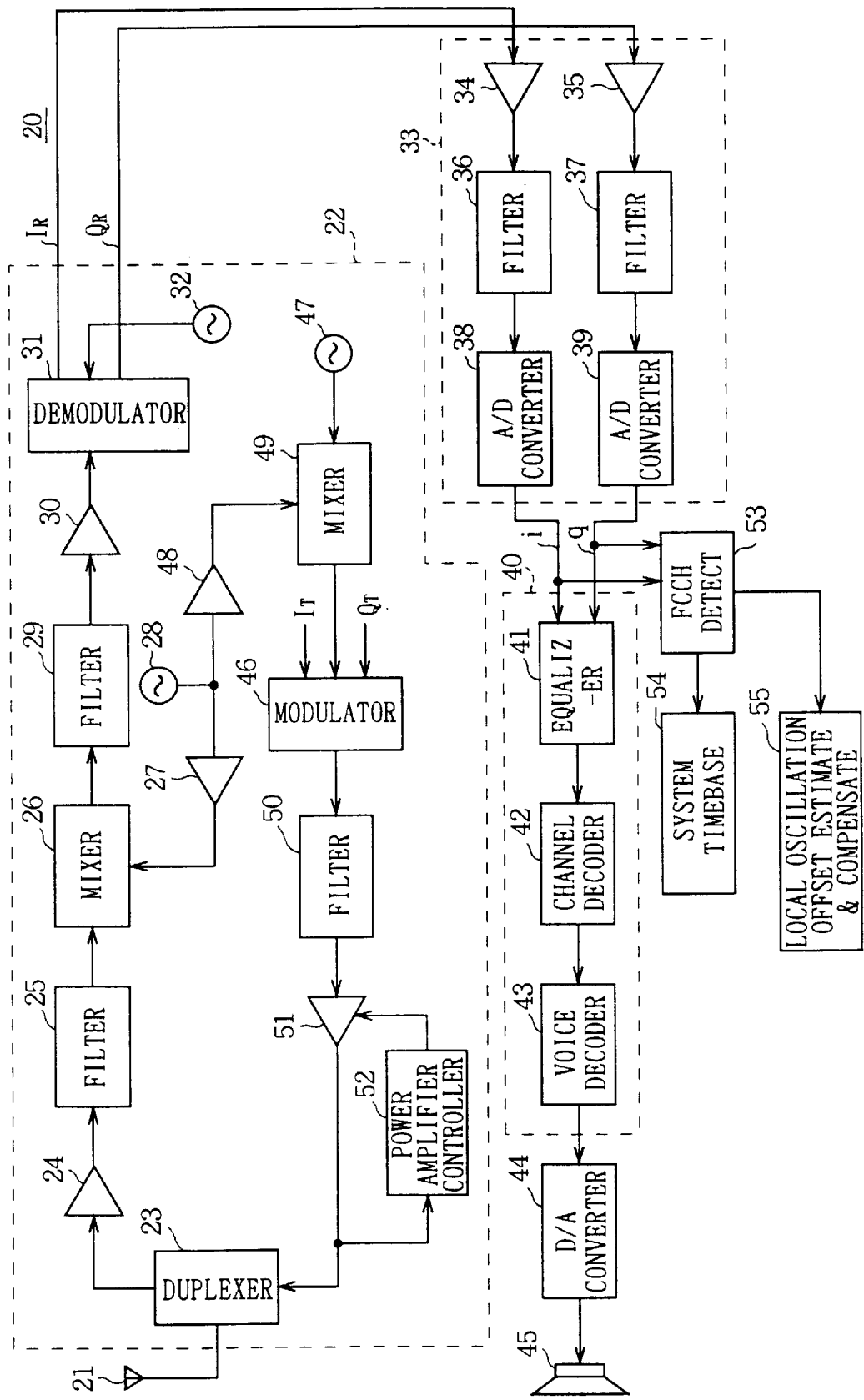
FIG. 8 is a block diagram illustrating mobile terminal equipment of the GSM cellular system according to an embodiment of this invention.

Preferred embodiments of this invention will be described with reference to the accompanying drawings:

In FIG. 8, the reference numeral 20 generally designates mobile terminal equipment of the GSM cellular system. The mobile terminal equipment 20 receives through an antenna 21 the transmission signal which has been issued from the base station, and inputs the resulted received-signal to a duplexer 23 of a radio frequency (RF) block 22. The duplexer 23 is an antenna sharing device which enables transmitting and receiving operations to share the antenna 21, and outputs the inputted received-signal to a low-noise amplifier 24.

The low-noise amplifier 24 amplifies the inputted received-signal and outputs it to a filter 25. The filter 25 limits the band of the received signal to eliminate the unnecessary components, and then outputs the received signal that has been band limited to a mixer 26. Using a local-oscillation signal which has been generated in an oscillator 28 and supplied through a buffer 27, the mixer 26 performs frequency conversion of the received signal to change it into a reception intermediate-frequency signal. This means that the received signal of 900 [MHz] of RF frequency which has entered at the antenna 21 is exposed to down-conversion into the intermediate-frequency signal.

In this connection, in the mobile terminal equipment 20, the desired broadcast channel can be received selectively, by switching the frequency of the local-oscillation signal which is generated in the oscillator 28.

The reception intermediate-frequency signal which has been obtained with the mixer 26 is exposed to band-limitation at a filter 29, and then amplified by an amplifier 30, and inputted to a demodulator 31. The demodulator 31 demodulates the reception intermediate-frequency signal using an oscillated signal which has been generated by an oscillator 32, so that the I-signal ($I_R$) and the Q-signal ($Q_R$) which are respective orthogonal signal components are obtained. The I-signal and the Q-signal are inputted to amplifiers 34 and 35 of a base-band block 33, respectively.

The amplifier 34 and the amplifier 35 amplify respectively the I-signal and the Q-signal which have been inputted respectively, and output the amplified I-signal and the amplified Q-signal to a filter 36 and a filter 37 respectively. The filter 36 and the filter 37 eliminate unnecessary components, leaving behind only the modulated wave components of the I-signal and the Q-signal respectively, and output the resulted I-signal and Q-signal to analog-to-digital (A/D) converters 38 and 39 respectively. The A/D converters 38 and 39 perform analog-to-digital conversion of the inputted I-signal and Q-signal respectively, on the basis of the stated sampling clock, and deliver respectively the resulting I data (i) and Q data (q) to an equalizer 41 of a digital signal processor (DSP) block 40.

The equalizer 41 performs correction of distortion with respect to the I data and the Q data to eliminate influences of multipath, etc., and restores the data which have been transmitted by the I data and the Q data, and then outputs it as the transmitted data. A channel decoder 42 and a voice decoder 43 extract the voice data from the transmitted data which are outputted from the equalizer 41, and output the voice data to a digital-to-analog (D/A) converter 44. In this connection, processing of each block in the DSP block 40 is performed basically by software installed in the equipment.

By converting the voice data into an analog voice signal by means of the D/A converter 44 in this way, the voice which is corresponding to the voice signal is outputted from a speaker 45.

On the other hand, in the case of transmission of, for instance, a voice signal in the mobile terminal equipment 20, the voice signal is exposed to orthogonal modulation through an analog-to-digital converter, a voice encoder, a channel encoder and so on, none of which are shown in FIG. 8, to be converted into the I data and the Q data, and then these are converted into analog signals by digital-to-analog converters not shown, so that the I signal ($I_T$) and the Q signal ($Q_T$) are generated. Then, the generated I signal and the Q signal are inputted to a modulator 46, and the oscillated signal, which is a carrier wave and which has been produced by oscillators 28 and 47, a buffer 48 and a mixer 49, is also inputted to the modulator 46. The modulator 46 performs modulation with respect to the oscillated signal on the basis of the inputted I signal and the Q signal, and outputs the resulted transmission signal to a filter 50.

The filter 50 limits the band of the transmission signal and eliminates the unnecessary components. The transmission signal which is outputted from the filter 50 is amplified by a power amplifier 51, and then introduced into the antenna 21 by the duplexer 23, and radiated in the air.

In this connection, the operation of the power amplifier 51 can be controlled by a power-amplifier controller 52, so that switching of the transmission output can be controlled according to the base station which is used, and transmission can be stopped at a time other than transmission timing.

In addition, by switching the frequency of the local oscillation signal which is generated in the oscillator 28, selective transmission in the desired broadcast channel is enabled.

By the way, the mobile terminal equipment 20 communicates with the base station using the TDMA system, therefore it must be synchronized with the base station at the time of various operations such as transmission or reception. Therefore, after the power has been turned on, the mobile terminal equipment 20 detects, at first, the FCCH in the control channel which is transmitted by the base station, and then roughly realizes the initial synchronization on the basis of the detected FCCH, and also compensates the local oscillation frequency offset.

Figure 7A:
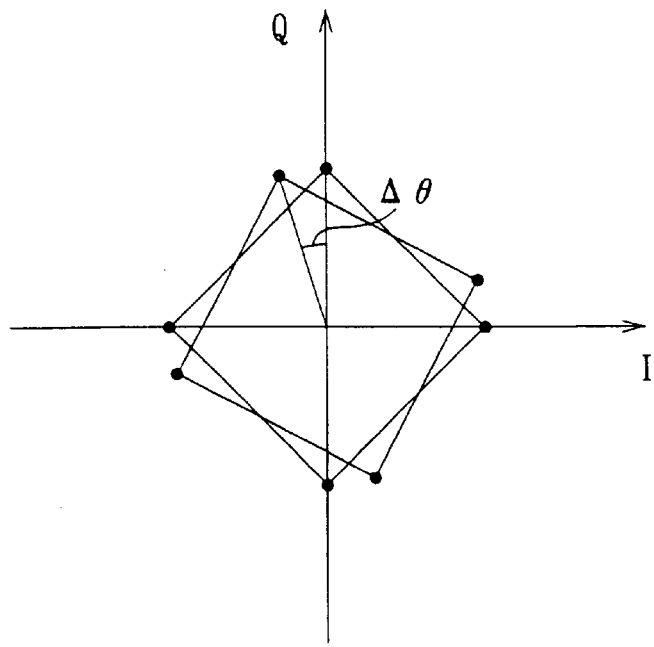
FIGS. 7A and 7B are schematic diagrams showing the influence of the calibration error.
Figure 7B:
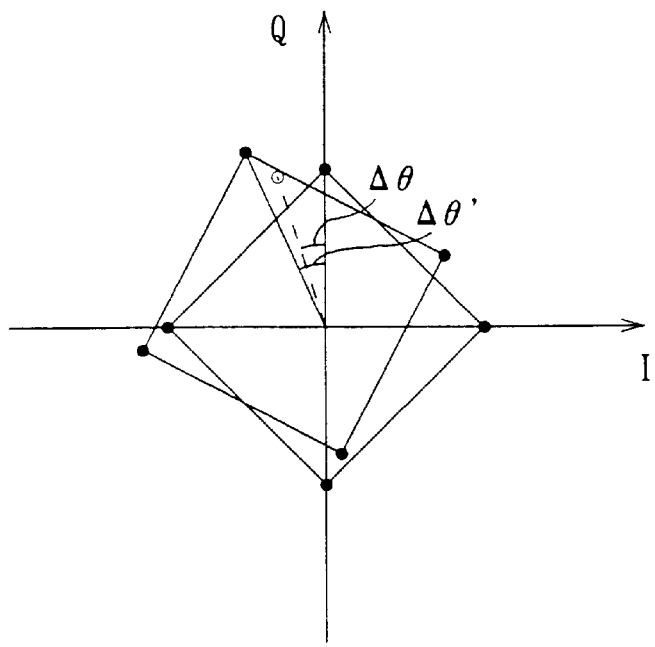

More specifically, after the power has been turned on, the mobile terminal equipment 20 receives, at first, the control channel which is transmitted by the base station. Then, on the basis of the resulting I data and the Q data, the equipment 20 detects the FCCH by an FCCH detecting part 53. Upon detecting the FCCH in the control channel, the FCCH detecting part 53 outputs the result of the detection to a system timebase part 54, and also outputs the quantity of phase drift (see. FIGS. 7A and 7B) which is obtained from the I data and the Q data to a local-oscillation-frequency offset estimate/compensate part 55.

The system timebase part 54 is one for performing time management of the operation of the entire system; and the part 54 resets a timer, etc., according to the result of the detection which is outputted by the FCCH detecting part 53, in other words, the timing of the FCCH, and performs time management of the entire system, and synchronizes various operations with the base station.

The local-oscillation-frequency offset estimate/compensate part 55 estimates a drift of the local oscillation frequency toward the base station on the basis of the quantity of phase drift which is outputted from the FCCH detecting part 53, and compensates the drift of the local oscillation frequency in accordance with the estimated value.

By the way, in the FCCH detecting part 53, by performing the calculation shown in equation (1) toward the I data and the Q data as usual, the correlation value is obtained and the FCCH is detected, and the quantity of phase drift is obtained on the basis of the I data and the Q data. At this time, the FCCH detecting part 53 digitally processes the occurred calibration error, and eliminates it from the I data and the Q data. By this, bad influences of calibration error can be avoided, in the mobile terminal equipment 20.

A correcting method for eliminating a calibration error in a digitalized manner is explained, hereinafter.

Figure 1:
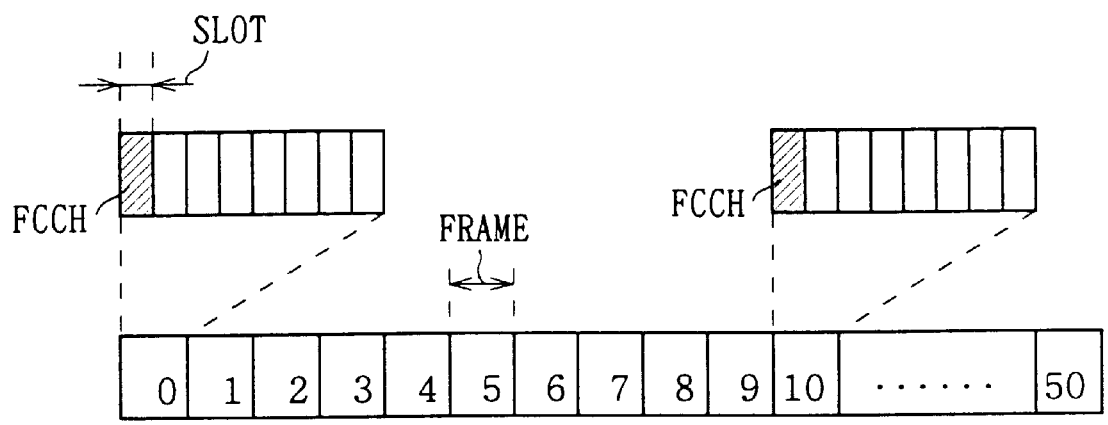
FIG. 1 is a schematic diagram illustrating the structure of the control channel.
Figure 2:
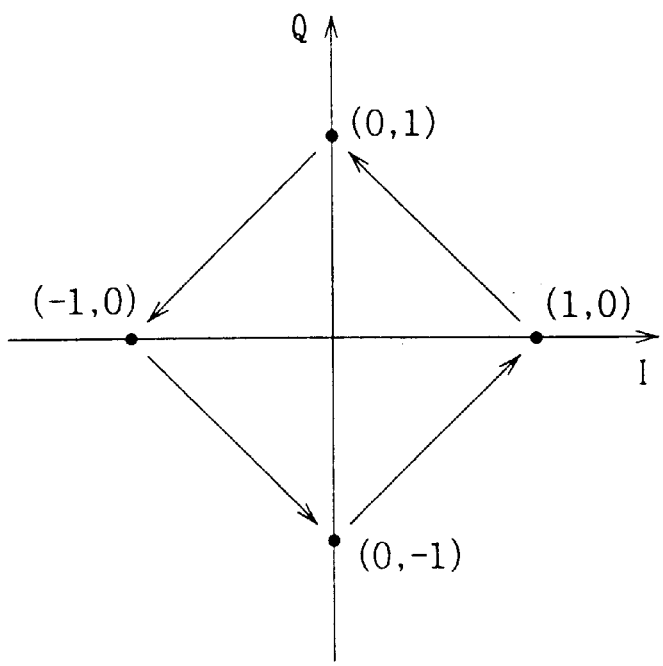
FIG. 2 is a schematic diagram showing the result of reception of the FCCH.
Figure 3:
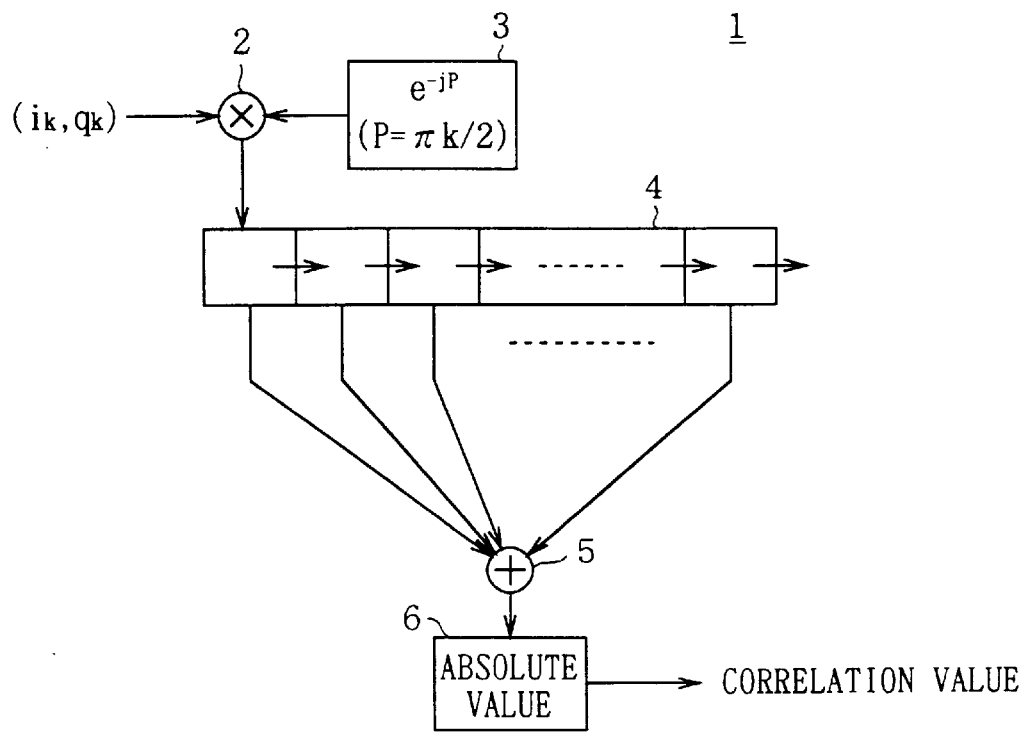
FIG. 3 is a block diagram illustrating the correlation value calculating circuit.
Figure 4:
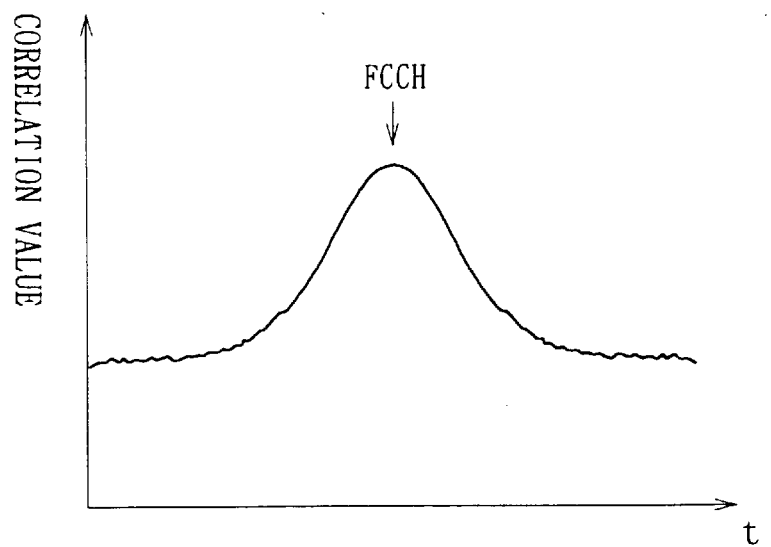
FIG. 4 is a schematic diagram showing the change of the correlation value.

As stated above, the FCCH is a control signal which is composed of continuous [0]s of the stated bits, therefore the received I,Q data are rotated by 90° in the same direction on the same circle on a complex plane (see. FIG. 2). Accordingly, when the continuous 4 samples of I,Q data are designated as ($i_k$, $q_k$) (where k=0, 1, 2, 3), and if there is no calibration error, each sum becomes [0] as shown in the following equation:

$$\sum_{k=0}^{8} i_k = 0, \sum_{k=0}^{8} q_k = 0 \qquad (2)$$

In other words, the center of the continuous 4 samples of I,Q data is located at the origin (0, 0) on the complex plane. Utilizing this point, a calibration error is eliminated in a digitalized manner, in the case of this embodiment.

First, the I,Q data which include a calibration error are designated as ($i_n$, $q_n$), and sum of the continuous 4 samples of I,Q data is obtained, and then the obtained sum is divided by the number of the samples (in other words, the mean value of the continuous 4 samples is found), as shown in the following equation:

$$(\Delta i_n, \Delta q_n) = \left\{ \sum_{k=0}^{8} (i_{n+k}, q_{n+k}) \right\} / 4 \qquad (3)$$

Then, as shown in the following equation:

$$(i'_n, q'_n) = (i_n, q_n) - (\Delta i_n, \Delta q_n) \qquad (4)$$

the mean value ($\Delta i_n$, $\Delta q_n$) of the continuous 4 samples which has been obtained in the abovementioned equation (3) is subtracted from the I,Q data ($i_n$, $q_n$) which include a calibration error, so that the I,Q data ($i_n$, $q_n$) are converted into the I,Q data ($i'_n$, $q'_n$).

In the I,Q data ($i'_n$, $q'_n$) which have been converted at this time, a calibration error is not included. Hereinafter, this point is explained.

First, the I,Q data which do not include a calibration error are designated as ($i''_n q''_n$), and the calibration error is designated as ($e_i$, $e_q$). Where, it is assumed that the value of the calibration error is same, with respect to a short period. On such an assumption, the I,Q data ($i_n$, $q_n$) which include a calibration error appear as the following equation:

$$(i_n, q_n) = (i''_n + e_i, q''_n + e_q) \quad (5)$$

Substituting this equation (5) for the abovementioned equation (3), we have the following equation:

$$(\Delta i_n, \Delta q_n) = \left\{\sum_{k=0}^{8}(i''_{n+k} + e_i, q''_{n+k} + e_q)\right\}/4 \quad (6)$$

$$= \left(\sum_{k=0}^{8} i''_{n+k} + \sum_{k=0}^{8} e_i, \sum_{k=0}^{8} q''_{n+k} + \sum_{k=0}^{8} e_q\right)/4$$

This equation (6) can be reduced into the following equation:

$$(\Delta i_n, \Delta q_n) = (e_i, e_q) \quad (7)$$

on the basis of the abovementioned equation (2).

In other words, the mean value of the continuous 4 samples becomes the calibration error itself, as will be seen from this equation (7). Therefore, it is known that the I,Q data ($i'_n$, $q'_n$) which have been obtained by the abovementioned equation (4) is the data which do not include a calibration error, as shown in the following equation:

$$(i'_n, q'_n) = (i''_n + e_i, q''_n + e_q) - (e_i, e_q) = (i''_n, q''_n) \quad (8)$$

In this way, in the FCCH detecting part 53, the mean value of the continuous 4 samples of the I,Q data is obtained to obtain the calibration error, and then the obtained calibration error is subtracted from the I,Q data, so that the calibration error is eliminated. By this, it is able to avoid bad influences based on a calibration error, in the mobile terminal equipment 20.

In this connection, as to the data other than FCCH, it is not rotated by 90° in the same direction, therefore the calibration error can not be eliminated with such a correcting method; however, it is not a problem, because detection of the FCCH is the object in the case of this embodiment.

Figure 9:
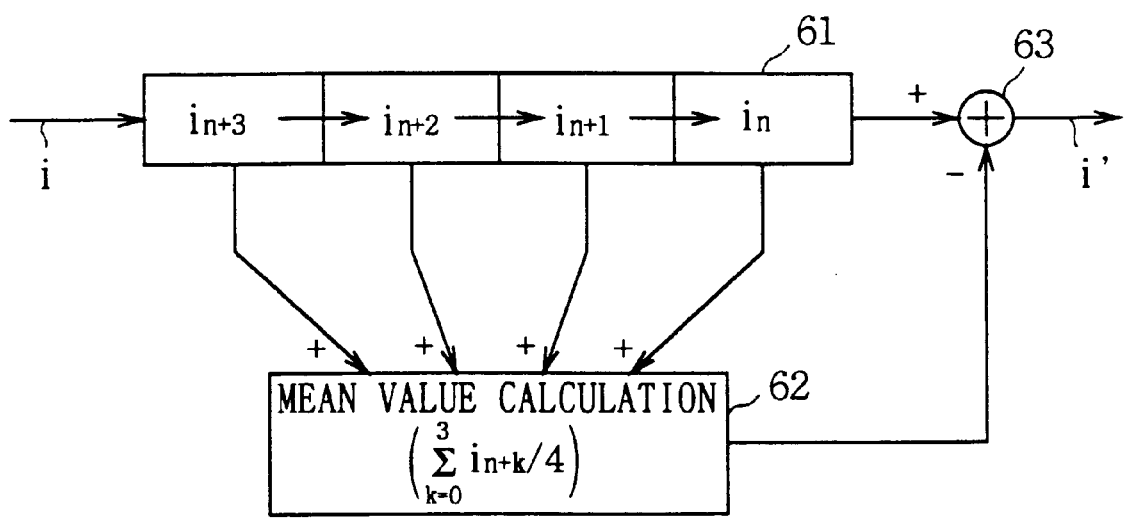
FIG. 9 is a block diagram illustrating the calibration error compensating circuit.
Figure 9:
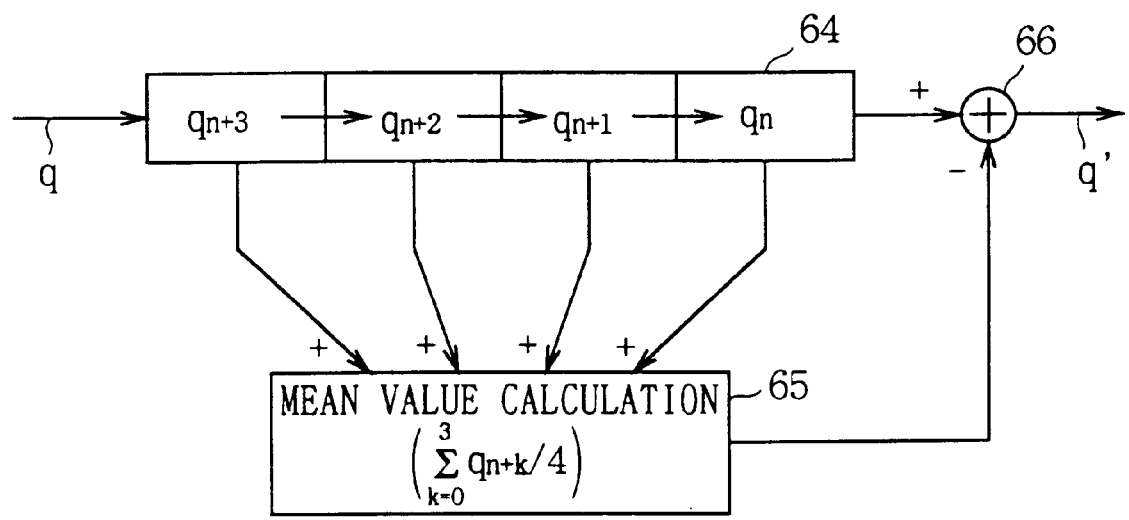

On this subject, a calibration error compensating circuit shown in FIG. 9 is provided, in practice, in the FCCH detecting part 53, so as to realize the abovementioned equation (4). As shown in this FIG. 9, in the calibration error compensating circuit 60, the I data (i) which has been issued from the A/D converter 38 of the baseband block 33 is inputted to a 4-stage shift-register 61, and shifted sequentially at this place. Therefore, in the respective registers of the shift register 61, the continuous 4 samples of the I data ($i_{n+3}$, $i_{n+2}$, $i_{n+1}$ and $i_n$) are arranged.

This continuous 4 samples of the I data are inputted to a mean value calculation part 62, respectively. The mean value calculation part 62 finds the sum of the inputted four I data, and then divides the found sum by the number of the samples, so as to obtain the mean value of the continuous 4 samples of the I data (that is, the calibration error), and then outputs the obtained mean value to an adder 63.

The adder 63 subtracts the mean value which is outputted from the mean value calculation part 62 from the I data ($i_n$) which is outputted from the shift register 61, and thereby obtains the I data (i') which does not include a calibration error, and outputs it.

Similarly, in the calibration error compensating circuit 60, the Q data (q) which has been issued from the A/D converter 39 of the baseband block 33 is inputted to a 4-stage shift-register 64, and shifted sequentially at this place. Therefore, in the respective registers of the shift register 64, the continuous 4 samples of the Q data ($q_{n+3}$, $q_{n+2}$, $q_{n+1}$ and $q_n$) are arranged.

This continuous 4 samples of the Q data are inputted to a mean value calculation part 65, respectively. The mean value calculation part 65 finds the sum of the inputted four Q data, and then divides the found sum by the number of the samples, so as to obtain the mean value of the continuous 4 samples of the Q data (that is, the calibration error), and then outputs the obtained mean value to an adder 66.

The adder 66 subtracts the mean value which is outputted from the mean value calculation part 65 from the Q data ($q_n$) which is outputted from the shift register 64, and thereby obtains the Q data (q') which does not include a calibration error, and outputs it.

So, in the FCCH detecting part 53, on the basis of the I data (i') and the Q data (q') of which calibration errors have been eliminated and which have been obtained by means of the calibration compensating circuit 60, the correlation value is found to detect the FCCH, and the quantity of phase drift which is used at the time of compensation of the local-oscillation-frequency offset is also found.

In the above construction, on the mobile terminal equipment 20, in order to realize synchronization with the base station, after the electric power source has been energized, a control channel which is transmitted by the base station is first received, and the FCCH in the control channel is detected by the use of the FCCH detecting part 53. At that time, the FCCH detecting part 53 finds the calibration error by finding the mean values of the I data and the Q data of the continuous 4 samples, and subtracts the found calibration error from the received I data and the received Q data to correct the I data and the Q data. Then, the FCCH detecting part 53 finds the correlation value on the basis of the corrected I data and the Q data so as to detect the FCCH, and also finds the quantity of phase drift which is used at the time of compensation of the local-oscillation-frequency offset.

Hereby, in the mobile terminal equipment 20, it can be avoided that the correlation value is lowered due to a calibration error and the provability of detecting the FCCH is hereby lowered as in the past, and the FCCH can be detected efficiently. Besides, in the mobile terminal equipment 20, it can be avoided that an error is generated in the quantity of phase drift due to a calibration error as in the past, and the local oscillation frequency offset can be compensated surely.

Figure 5:
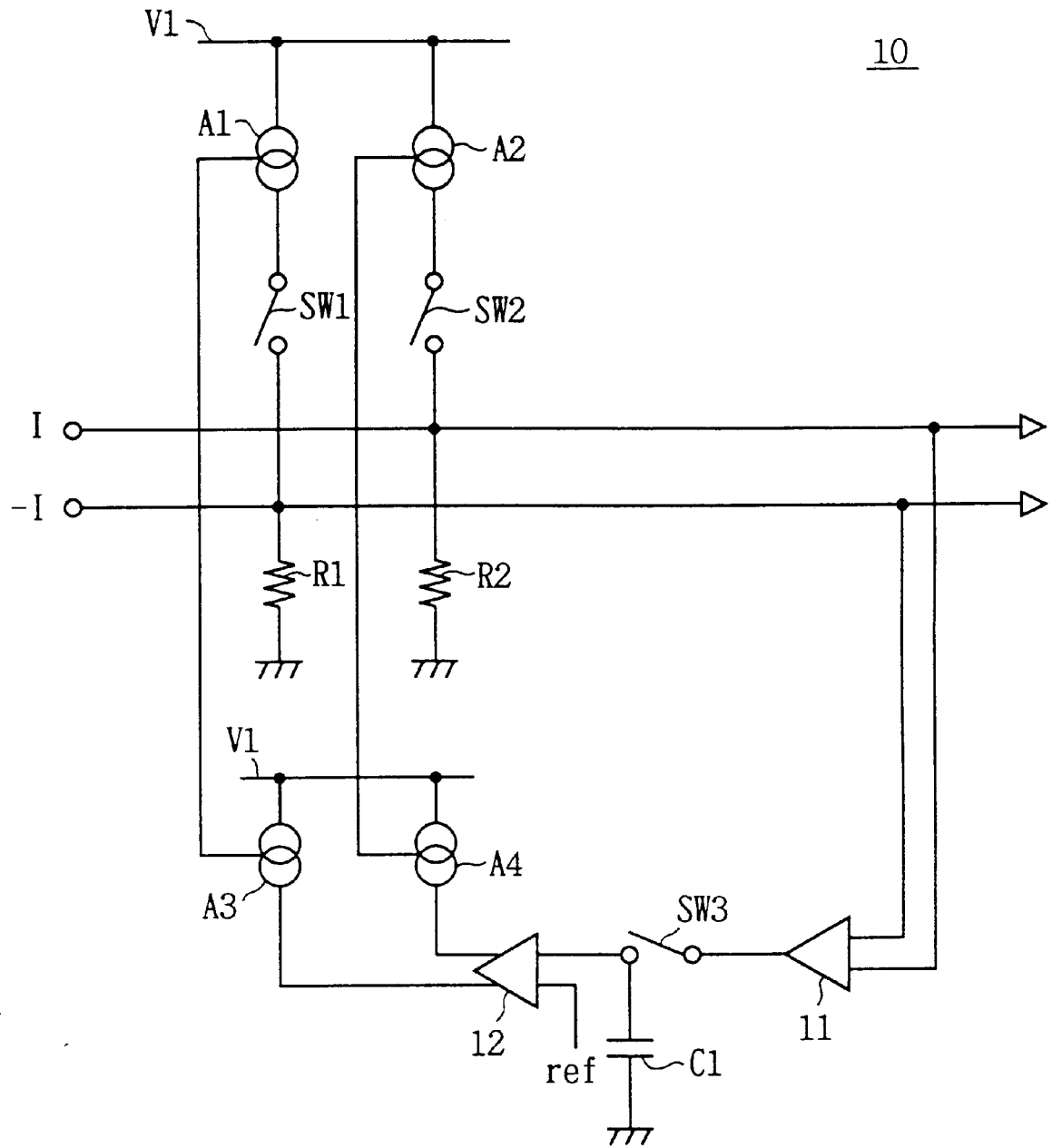
FIG. 5 is a connection diagram illustrating the calibration circuit.
Figure 6:
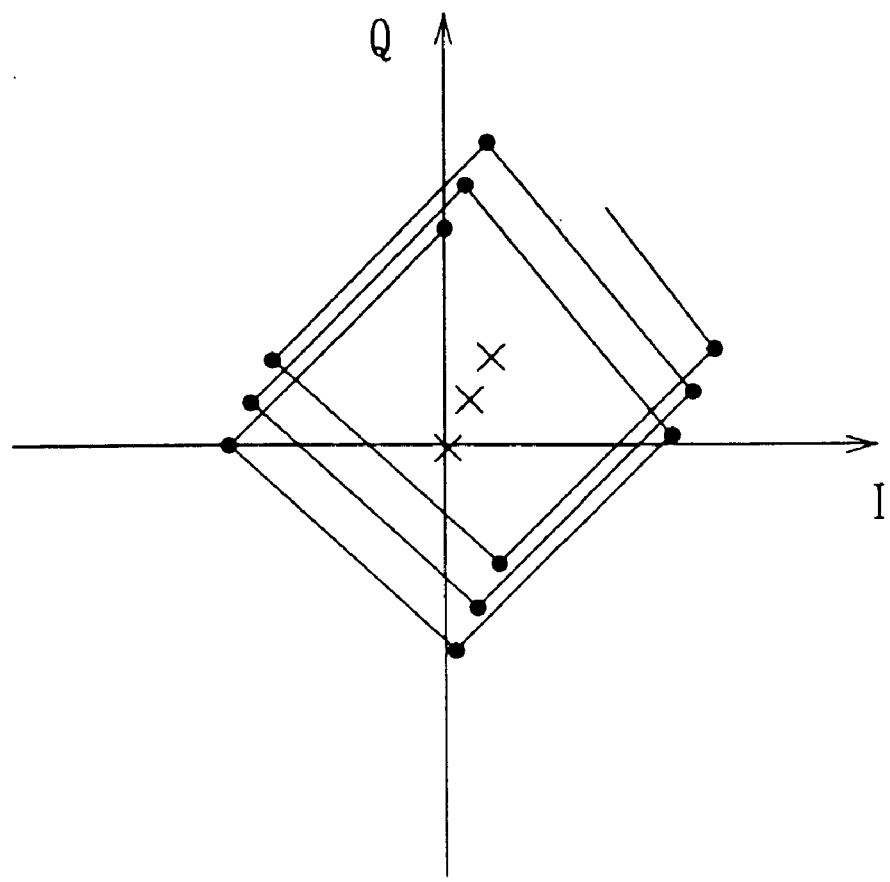
FIG. 6 is a schematic diagram showing the calibration error.

In this connection, taking a calibration utilizing an analog calibration circuit (see. FIG. 5) has been usually performed in the past; but it has been very difficult to maintain such a state, for a long time after the calibration has been taken. However, in the case of this embodiment, even though such a state that the calibration has been taken can not be maintained for a long time, the FCCH can be detected efficiently owing to the fact that compensation is performed in a digitalized manner. Besides, if a calibration error is compensated ultimately in a digitalized manner like this embodiment, then an analog calibration can be omitted from the beginning.

According to the above construction, the FCCH detecting part 53 is provided which finds the calibration error on the basis of the mean values of the I data and the Q data of the continuous 4 samples, corrects the I data and the Q data using the found calibration error, and detects the FCCH on the basis of the corrected I data and the Q data. As a result, the calibration error can be easily compensated with a simple construction and the FCCH can be detected efficiently.

In the aforementioned embodiment, the calibration error has been obtained on the basis of the mean value of the continuous 4 samples of the I,Q data, however, the same effects as the above can be also obtained in the case where a calibration error is found on the basis of the mean value of the continuous (4×n) samples of the I,Q data, where n is a natural number (that is, n=0, 1, 2, . . . ), as the other embodiment. Besides, in this embodiment, a calibration error may be obtained on the basis of the mean value of only the even-numbered I,Q data or only the odd-numbered I,Q data out of the continuous (4×n) samples. In brief, a calibration error can be obtained also by obtaining a calibration error using I,Q data which are located symmetrically with respect to the origin (0, 0) on the complex plane.

In the aforementioned embodiments, the quantity of phase drift is found by the FCCH detecting part 53, and the drift of the local oscillation frequency is estimated and compensated by the local-oscillation-frequency offset estimate and compensate part 55, however, this invention is not limited to this but the same effects as the above can be also obtained in the case where the quantity of phase drift is found and also the drift of the local oscillation frequency is estimated, on the basis of the found quantity of phase drift, and compensated, in the local-oscillation-frequency offset estimate and compensate part 55, on the basis of the I,Q data which has been corrected by the FCCH detecting part 53.

Further, in the aforementioned embodiments, this invention has been applied to detection of the FCCH in the GSM cellular system, however, this invention is not limited to this but is widely applicable to detection of a control signal wherein the received data are rotated by 90° in the same direction on the same circle on a complex plane, at the time of reception.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A control signal detection method for detecting the control signal in received continuous (4×n) data, signal points of said control signal being rotated by 90° in the same direction on the same circle on a complex plane, comprising the steps of:

obtaining a mean value of said received continuous (4×n) data existing on said complex plane, where n is a natural number, for obtaining a calibration error value for data demodulation;

subtracting the calibration error value from said received continuous data for producing corrected received continuous data; and obtaining a correlation value on the basis of the corrected received continuous data, thereby detecting said control signal.

2. The control signal detection method according to claim 1, wherein p1 said step of obtaining a calibration error value includes obtaining a mean value of four data of said received continuous data.

3. The control signal detection method according to claim 1, wherein said step of obtaining a mean value includes using even-numbered data or odd-numbered data out of said received continuous (4×n) data.

4. A subscriber unit for receiving data transmitted from a base station and for detecting a control signal in received continuous (4×n) data, in which signal points in said control signal are rotated by 90° in the same direction on the same circle on a complex plane, comprising:

a radio frequency circuit receiving the continuous (4×n) data signal for conversion thereof into a baseband data signal;

a baseband circuit receiving said baseband data signal for conversion thereof into a digital signal;

calibration error value operation means for obtaining a mean value of said received continuous (4×n) data existing on said complex plane, where n is a natural number, for obtaining a calibration error value for data demodulation;

error compensation means for error-calibrating with respect to said received continuous data on the basis of the calibration error value from said calibration error value operation means for compensating an error of said received continuous data; and control signal detection means for obtaining a correlation value on the basis of the error-calibrated received data, so that said control signal is detected.

5. The subscriber unit according to claim 4, wherein said calibration error value operation means includes means for obtaining the mean value of four data of said received continuous data.

6. The subscriber unit according to claim 5, wherein said calibration error value operation means includes means for obtaining the mean value by the use of even-numbered data or odd-numbered data out of said received continuous (4×n) data.

7. The subscriber unit according to claim 4, further comprising means for performing timebase adjustment with respect to said subscriber unit on the timing of said control signal which has been detected by said control signal detection means.

8. The subscriber unit according to claim 4, further comprising means for compensating the oscillation frequency of a local oscillator provided in said subscriber unit on the basis of the received data which has been error-corrected by said error correction means.

* * * * *